United States Patent
Akikusa et al.

(10) Patent No.: US 7,235,322 B2
(45) Date of Patent: Jun. 26, 2007

(54) HYBRID POWER SYSTEM INCLUDING AN ENGINE AND A FUEL CELL MODULE

(75) Inventors: Jun Akikusa, Chiyoda-ku (JP); Hoshino Koji, Chiyoda-ku (JP)

(73) Assignee: Mitsubishi Materials Corporation, Tokyo (JP)

( * ) Notice: Subject to any disclaimer, the term of this patent is extended or adjusted under 35 U.S.C. 154(b) by 295 days.

(21) Appl. No.: 10/451,804

(22) PCT Filed: Dec. 27, 2001

(86) PCT No.: PCT/JP01/11559

§ 371 (c)(1),
(2), (4) Date: Jun. 26, 2003

(87) PCT Pub. No.: WO02/054517

PCT Pub. Date: Jul. 11, 2002

(65) Prior Publication Data

US 2004/0053087 A1    Mar. 18, 2004

(30) Foreign Application Priority Data

Dec. 28, 2000    (JP) ............................. 2000-402475
Dec. 20, 2001    (JP) ............................. 2001-387934

(51) Int. Cl.
*H01M 8/10*    (2006.01)
*H01M 8/18*    (2006.01)
*B60K 1/00*    (2006.01)
*F02B 43/08*    (2006.01)

(52) U.S. Cl. ............................. 429/32; 429/20; 429/34; 429/12; 180/65.3; 903/905; 903/908; 422/187; 123/3

(58) Field of Classification Search ................ 429/32, 429/34, 38, 30, 12, 19, 20, 24; 903/905, 903/908, 943, 944; 180/65.3; 422/187, 422/188; 123/2, 3, 187, 188; 290/50, 51
See application file for complete search history.

(56) References Cited

U.S. PATENT DOCUMENTS

| 6,255,010 | B1 * | 7/2001 | George et al. ................. 429/30 |
| 6,541,875 | B1 * | 4/2003 | Berlinger et al. ............ 290/1 R |
| 2004/0079564 | A1 * | 4/2004 | Tabata ....................... 180/65.2 |

FOREIGN PATENT DOCUMENTS

| EP | 0 668 622 | 8/1995 |
| EP | 0 673 074 | 9/1995 |
| JP | 6-140065 | 5/1994 |
| JP | 10-304511 | 11/1998 |

(Continued)

OTHER PUBLICATIONS

R. Kumar et al., "Solid Oxide Fuel Cells for Transportation: A Clean, Efficient Alternative for Propulsion", US DOE Rep., 1993 (US), 9P.

*Primary Examiner*—Raymond Alejandro
(74) *Attorney, Agent, or Firm*—Wenderoth, Lind & Ponack, L.L.P.

(57) ABSTRACT

A mixture of a fuel gas obtained by vaporizing hydrocarbon and air is burned in an engine 11 to generate mechanical power. The fuel gas obtained by reforming the hydrocarbon is supplied to a fuel electrode layer of a fuel cell module 13 in which plural electric power generating cells each including a solid electrolyte layer, and a fuel electrode layer and an air electrode layer disposed on both sides thereof are laminated, and the air or oxygen is supplied to the air electrode layer, so that the fuel cell module 13 is constructed to be capable of generating electric power at 930° C. or lower. One of or both of mechanical power generated by the engine 11 and electric power generated by the fuel cell module 13 are outputted. As a raw material of the fuel gas supplied to the fuel cell module, gasoline, light oil or the like which can be supplied in a normal gasoline station can be used.

18 Claims, 5 Drawing Sheets

FOREIGN PATENT DOCUMENTS

| | | |
|---|---|---|
| JP | 11-311136 | 11/1999 |
| JP | 2000-77088 | 3/2000 |
| WO | 96/07560 | 3/1996 |
| WO | 99/13521 | 3/1999 |

\* cited by examiner

HYBRID POWER SYSTEM INCLUDING AN ENGINE AND A FUEL CELL MODULE

TECHNICAL FIELD

The present invention relates to a hybrid power system using a fuel cell module of a solid oxide type.

BACKGROUND OF THE INVENTION

Conventionally, a fuel cell power generating system is constructed such that a raw material containing liquid fuel and water as its main ingredients is heated and decomposed by a burner of a reformer to generate hydrogen gas, a fuel cell in which a fuel electrode and an oxygen electrode are disposed on both sides of an electrolyte layer introduces the hydrogen gas generated by the reformer into the fuel electrode to generate electric power and supplies steady electric power to a specified load, a secondary battery supplies required electric power to the load at least at the time of load starting or the time of load variation, and power supply changeover means can switch between power supplied from the fuel cell and power supplied from the secondary battery (JP-A-6-140065). This fuel cell power generating system is constructed such that fuel cell heating means for guiding combustion gas jetted from the burner of the reformer to the fuel cell is provided, and the fuel cell is heated by the fuel cell heating means up to a temperature at which starting is enabled (electric power generation is enabled). Besides, the electrolyte layer is formed of a polymer film having ion conductivity, and methanol is used as the liquid fuel.

In the fuel cell power generating system constructed as stated above, the time that elapses before the fuel cell starts the electric power generation can be greatly shortened by heating the fuel cell to a predetermined temperature by the combustion gas of the burner used at the time of generation of hydrogen in the reformer, so that the power generation efficiency of the fuel cell can be improved. Besides, since the power supply from the secondary battery can be reduced by this, the number of secondary batteries can be decreased, and the compact and lightweight fuel cell power generating system can be obtained.

However, in the conventional fuel cell power generating system disclosed in JP-A-6-140065, since the raw material of the fuel gas supplied to the fuel cell is methanol, if this system is mounted in an automobile, there has been a disadvantage that refueling can not be carried out in a normal gasoline station.

Besides, in the conventional fuel cell power generating system, since the working temperature of the fuel cell is relatively low, there has been a problem that unless methanol is supplied to the fuel cell after it is completely reformed into $H_2$ (hydrogen gas) by the reformer, the power generation efficiency of the fuel cell is lowered.

Further, in the conventional fuel cell power generating system, since the electrolyte layer is formed of the polymer film, there has been a problem that there is a fear that CO (carbon monoxide) is exhausted from the power generating cell, and the treatment of the carbon monoxide is troublesome.

SUMMARY OF THE INVENTION

A first object of the invention is to provide a hybrid power system in which gasoline, light oil or the like which can be fed in a normal gasoline station can be used as a raw material of a fuel gas supplied to a fuel cell module.

A second object of the invention is to provide a hybrid power system in which, since the working temperature of a fuel cell is relatively high, even if CO or $CH_4$ (methane gas) in addition to $H_2$ is directly supplied to the fuel cell, a fuel cell module can efficiently generate electric power.

A third object of the invention is to provide a hybrid power system in which, since the working temperature of a fuel cell is relatively high, hydrocarbon such as gasoline or light oil can be quickly reformed into low hydrocarbon, CO or $H_2$ by using waste heat of an engine or a fuel cell.

The invention is, as shown in FIGS. 1 and 2, a hybrid power system comprising an engine 11 for generating mechanical power by combustion of a mixture of a fuel gas obtained by vaporizing hydrocarbon and air, and a fuel cell module 13 in which plural electric power generating cells 24 each including a solid electrolyte layer 29, and a fuel electrode layer 31 and an air electrode layer 32 disposed on both sides of the solid electrolyte layer 29 are laminated. The fuel gas obtained by reforming the hydrocarbon is supplied to the fuel electrode layer 31, and the air or oxygen is supplied to the air electrode layer 32 so that electric power can be generated at 930° C. or lower. One of or both of the mechanical power generated by the engine 11 and the electric power generated by the fuel cell module 13 are outputted.

In the hybrid power system discussed above, when the engine 11 is started, the engine 11 generates the mechanical power. Besides, when the fuel cell module 13 reaches the temperature at which electric power can be generated, the fuel gas obtained by reforming hydrocarbon, together with the air or oxygen, is supplied to the fuel cell module 13, and the fuel cell module 13 starts electric power generation and generates electric power. When the electric power generated by the fuel cell module 13 is sufficient, the engine 11 is stopped, and when the electric power generated by the fuel cell module 13 is insufficient, the engine 11 is started, and the mechanical power generated by the engine 11 is outputted.

Further, as shown in FIG. 1, the fuel cell module 13 is heated by an exhaust gas exhausted from the engine 11, and starting becomes possible. Since the fuel cell module 13 is heated by the heat of the exhaust gas exhausted from the engine 11 up to the temperature at which starting becomes possible, the fuel cell module 13 comes to be capable of generating electric power.

Further, as shown in FIG. 1, the mechanical power generated by the engine 11 is converted into electric power by a generator 12 and is outputted. When the engine 11 is started, the generator 12 is driven by the engine 11 to generate the electric power. When the fuel cell module 13 reaches the temperature at which electric power can be generated, the fuel gas obtained by reforming hydrocarbon, together with the air or oxygen, is supplied to the fuel cell module 13, and the fuel cell module 13 starts electric power generation and generates the electric power. When the electric power generated by the fuel cell module 13 is sufficient, the engine 11 is stopped, and when the electric power generated by the fuel cell module 13 is insufficient, the engine 11 is started and the mechanical power generated by the engine 11 is converted into the electric power by the generator 12 and is outputted.

Further, as shown in FIG. 1, a secondary battery 14 for storing the electric power generated by one of or both of the fuel cell module 13 and the generator 12. When the output is insufficient, the electric power stored in the secondary battery 14 is outputted, and when the electric power generated by the fuel cell module 13 or the generator 12 is superfluous, the electric power generated by the fuel cell module 13 or the generator 12 is stored in the secondary battery 14.

Further, as shown in FIG. 1, electric power generated by one or at least two selected from the group consisting of the fuel cell module 13, the generator 12 and the secondary battery 14 is outputted to electric equipment 16, and the electric equipment 16 is driven by the electric power. When the engine 11 is started, the generator 12 is driven by the engine 11 to generate the electric power, and this electric power is outputted to the electric equipment 16. When the fuel cell module 13 reaches the temperature at which electric power can be generated, the fuel gas obtained by reforming the hydrocarbon, together with the air or oxygen, is supplied to the fuel cell module 13, the fuel cell module 13 starts electric power generation to generate electric power, and this electric power is supplied to the electric equipment 16. When the electric power supplied from the fuel cell module 13 to the electric equipment 16 is sufficient, the engine 11 is stopped. When the electric power outputted to the electric equipment 16 is insufficient, the engine 11 is started, and the mechanical power generated by the engine 11 is converted into the electric power by the generator 12 and is outputted to the electric equipment 16. It is preferable that the electric equipment 16 is an electric motor.

Further, as shown in FIGS. 1 and 2, the fuel gas supplied to the electric power generating cells 24 is reformed by the exhaust gas exhausted from the engine 11. Since the fuel gas before the supply to the electric power generating cells 24 is heated by the heat of the exhaust gas exhausted from the engine 11 up to the temperature at which the fuel gas can be reformed, the fuel gas is reformed to become a low hydrocarbon group most suitable for an electric power generating operation.

Further, as shown in FIGS. 1 and 2, a fuel preheating pipe 61 for preheating the fuel gas and supplying it to the fuel electrode layer 31 is provided in the fuel cell module 13, and an oxidant preheating pipe 62 for preheating an oxidant gas and supplying it to the air electrode layer 32 is provided in the fuel cell module 13. The oxidant preheating pipe 62 is preheated by the exhaust gas exhausted from the engine 11, and the fuel preheating pipe 61 is also preheated by the exhaust gas exhausted from the engine 11, and hydrocarbon containing water vapor and passing through the fuel preheating pipe 61 is reformed. After the fuel gas in the fuel preheating pipe 61 and the oxidant gas in the oxidant preheating pipe 62 are heated by the exhaust gas of the engine 11, they are supplied to the electric power generating cells 24. Therefore, the electric power generating cells 24 are quickly heated up to the most suitable temperature and come to be capable of generating electric power.

Further, as shown in FIG. 2, reforming particles are filled in the fuel preheating pipe 61 at such a density that hydrocarbon can flow. The fuel gas containing water vapor comes in contact with the reforming particles in the fuel preheating pipe 61, is reformed into the fuel gas of the low hydrocarbon group or the like, and is supplied to the electric power generating cell 24.

Further, as shown in FIGS. 1 and 2, a reformer 64 is provided near the fuel cell module 13. The reformer 64 includes a reforming case 66 into which the exhaust gas of the engine 11 is introduced, and a reforming pipe 67 housed in the reforming case 66 and filled with reforming particles at such a density that hydrocarbon can flow. The hydrocarbon passes through the reforming pipe 67 so that the hydrocarbon is reformed into the fuel gas of a low hydrocarbon group or the fuel gas of CO or $H_2$, and is supplied to the fuel cell module 13. When the hydrocarbon, together with water, flows into the reforming pipe 67 of the reformer 64, the hydrocarbon and water are heated by the exhaust gas passing through the reforming case 66 and are vaporized, and become the fuel gas containing water vapor. The fuel gas containing the water vapor comes in contact with the reforming particles in the reforming pipe 67, is reformed into the fuel gas of the low hydrocarbon group, or the like, and is supplied to the fuel cell module 13. Since the reformer 64 is provided near the fuel cell module 13, the reformer 64 absorbs heat generated from the fuel cell module 13 at the time of electric power generation, and the fuel gas containing the water vapor is further efficiently reformed by the reforming particles in the reforming pipe 67 into the fuel gas of the low hydrocarbon group, or the like.

Further, as shown in FIG. 2, a first auxiliary heater 81 for heating the reforming pipe 67 in the reformer 64 is provided. When the hydrocarbon, together with water, flows into the reforming pipe 67 of the reformer 64, the hydrocarbon and the water are heated by not only the exhaust gas of the engine 11 passing through the reforming case 66, but also by the first auxiliary heater 81, and they are quickly vaporized and become the fuel gas containing water vapor. The fuel gas containing the water vapor comes in contact with the reforming particles in the reforming pipe 67, and is quickly reformed into the fuel gas of the low hydrocarbon group or the fuel gas of CO or $H_2$.

Further, as shown in FIG. 2, a second auxiliary heater 82 for heating the fuel preheating pipe 61 and the oxidant preheating pipe 62 in the fuel cell module 13 is provided. When the fuel gas of the low hydrocarbon group, or the fuel gas of CO or $H_2$ flows into the fuel preheating pipe 61 in the fuel cell module 13, and the oxidant gas flows into the oxidant preheating pipe 62, the fuel gas and the oxidant gas are heated by not only the exhaust gas of the engine 11 passing through the fuel cell module 13, but also the second auxiliary heater 82, and are heated to a relatively high temperature most suitable for electric power generation. Then, they are supplied to the electric power generating cells 24.

Further, as shown in FIGS. 1 and 2, a fuel supply pipe 68 is connected to a base end of the fuel preheating pipe 61, and a fuel injector 73 for spraying the hydrocarbon with a high melting point, which is liquid at room temperature, among hydrocarbons and supplying it to the fuel preheating pipe 61 is provided to the fuel supply pipe 68.

Further, as shown in FIGS. 1 and 2, a water supply pipe 74 is connected to the fuel supply pipe 68, and a water injector 76 for spraying water and supplying it to the fuel supply pipe 68 is provided to the water supply pipe 74. Thus, the liquid fuel or water can be quickly vaporized.

Further, as shown in FIG. 1, a module temperature sensor 72 for detecting the temperature of the fuel cell module 13 is inserted in the fuel cell module 13. When the module temperature sensor 72 detects that the fuel cell module 13 is heated by the exhaust gas of the engine 11 to reach the temperature at which the fuel cell module 13 can generate electric power, a controller 77 controls the fuel cell module 13 to start an electric power generating operation. When the fuel cell module 13 has a low temperature as at a time immediately after the start of the engine 11, the state is kept in which electric power generation by the fuel cell module 13 is stopped. When the temperature sensor 72 detects that the fuel cell module 13 is heated by the exhaust gas of the engine 11 and reaches the temperature at which electric power can be generated, the electric power generation by the fuel cell module 13 is started, so that efficient electric power generation by the fuel cell module 13 becomes possible.

It is also preferable that on the basis of a load of the electric equipment 16, the controller 77 controls one or at least two selected from the group consisting of the engine 11, the fuel cell module 13, and the secondary battery 14.

The structure may also be such that an oxidant flow rate adjusting valve 71 is provided in an oxidant supply pipe 69 provided at a base end of the oxidant preheating pipe 62, a reformer temperature sensor detects temperature of the reformer 64, and the controller 77 controls the fuel injector 73, the water injector 76, the oxidant flow rate adjusting valve 71, the first auxiliary heater 81, and the second auxiliary heater 82 on the basis of respective detection outputs of the module temperature sensor 72 and the reformer temperature sensor.

The structure may be such that a communicating pipe 63f for connecting an inside chamber 63d of a cell case 63 housing the fuel cell module 13 and an outside chamber 63e is provided with a first motor valve 91 for opening and closing the communicating pipe 63f. An upstream side exhaust pipe 21a for connecting the engine 11 and the fuel cell module 13 is provided with a second motor valve 92 for opening and closing the upstream side exhaust pipe 21a. An upstream side branch pipe 21c for connecting the upstream side exhaust pipe 21a and the reformer 64 is provided with a third motor valve 93 for opening and closing the upstream side branch pipe 21c. The controller 77 controls the first to the third motor valves 91 to 93 on the basis of respective detection outputs of the module temperature sensor 72 and the reformer temperature sensor.

Incidentally, it is preferable that an automobile, a ship, a train, an airplane, a motorcycle or a construction equipment is driven by one of or both of the mechanical powers generated by the electric equipment 16 and the engine 11.

DETAILED DESCRIPTION OF THE INVENTION

Next, an embodiment of the invention will be described with reference to the drawings.

Figure 1:
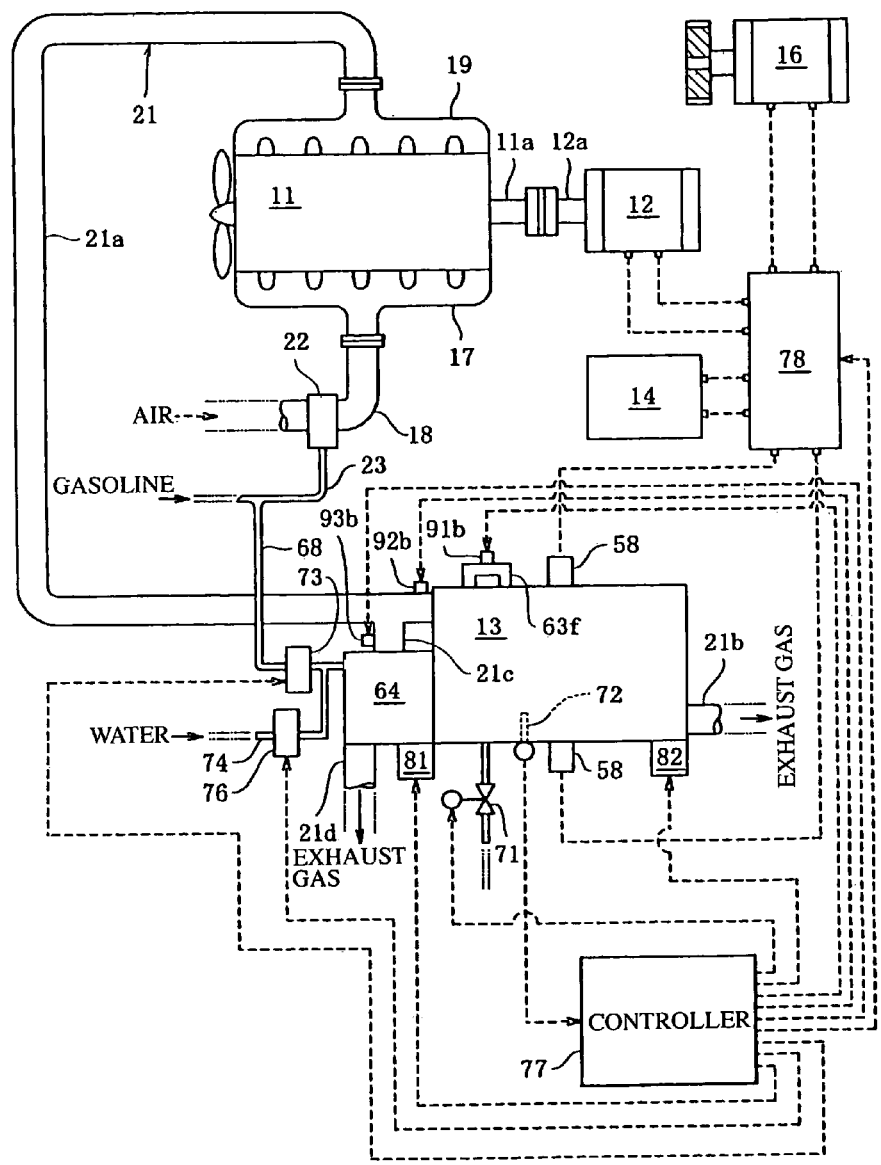
FIG. 1 is a schematic view showing a hybrid power system of an embodiment of the invention.

As shown in FIG. 1, a hybrid power system of the invention is mounted in an automobile. This hybrid power system includes an engine 11 using gasoline as fuel, a generator 12 an input shaft 12a which is coupled with a crank shaft 11a of the engine 11, a fuel cell module 13 which can generate electric power at 930° C. or lower, a secondary battery 14, and an electric motor 16. An intake pipe 18 is connected to an intake port of the engine 11 through an intake manifold 17, and an upstream side exhaust pipe 21a of an exhaust pipe 21 is connected to an exhaust port of the engine 11 through an exhaust manifold 19. A carburetor 22 for vaporizing gasoline to supply it to the intake pipe 18 is provided midway in the intake pipe 18, and a tip end of a refueling pipe 23, a base end of which is connected to a fuel tank (gasoline is stored), is connected to the carburetor 22. Gasoline vaporized by the carburetor 22 is mixed with air, is supplied to a cylinder (not shown) of the engine 11 through the intake pipe 18 and the intake manifold 17, and is explosively burned in this cylinder to drive a piston (not shown), so that the crank shaft 11a is rotated. The generator 12 is constructed such that the rotation force of the crank shaft 11a is transmitted to the input shaft 12a to generate electric power. Incidentally, the invention can also be applied to a rotary engine having a triangular rotor and an eccentric shaft, not a reciprocating engine having a cylindrical piston and a crank shaft.

Figure 2:
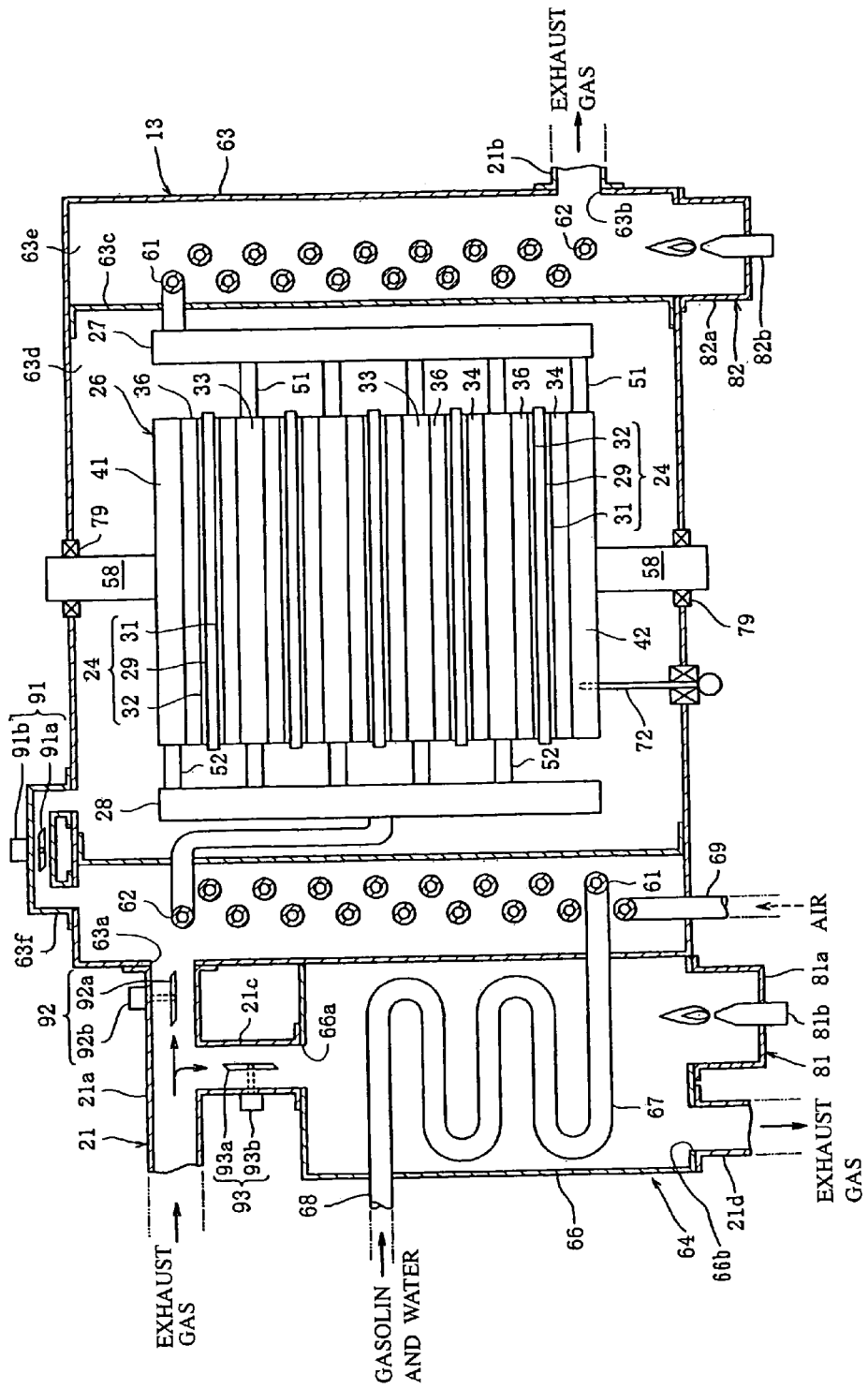
FIG. 2 is a longitudinal sectional view of a fuel cell module used for this system.

It is preferable that the fuel cell module 13 can generate electric power within a range of 300 to 900° C. As shown in FIG. 2, it includes a fuel cell 26 having (n+1) laminated electric power generating cells 24, and a fuel distributor 27 and an air distributor 28 respectively provided near the fuel cell 26. Here, n is a positive integer. The electric power generating cell 24 includes a disk-shaped solid electrolyte layer 29, and a disk-shaped fuel electrode layer 31 and air electrode layer 32 disposed on both sides of the solid electrolyte layer 29. N separators 33 in total, each formed into a square plate shape by conductive material, is put between the fuel electrode layer 31 of the ith (i=1, 2, . . . , n) electric power generating cell 24 and the air electrode layer 32 of the (i+1)th electric power generating cell 24 adjacent to this fuel electrode layer 31. A porous fuel electrode current collector 34 formed into a disk shape and having conductivity is put between the fuel electrode layer 31 of the ith electric power generating cell 24 and the jth (j=1, 2, . . . , n) separator 33, and a porous air electrode current collector 36 formed into a disk shape and having conductivity is put between the air electrode layer 32 of the (i+1)th electric power generating cell 24 and the jth separator 33. Further, a single first end plate 41 formed into a square plate shape by conductive material is laminated on the air electrode layer 32 of the first electric power generating cell 24 through the air electrode current collector 36, and a single second end plate 42 formed into a square plate shape by conductive material is laminated on the fuel electrode layer 31 of the (n+1)th electric power generating cell 24 through the fuel electrode current collector 34. Incidentally, the solid electrolyte layer, the fuel electrode layer, the air electrode layer, the fuel electrode current collector and the air electrode current collector may be formed into a polygonal plate shape, such as a square plate shape, a hexagonal plate shape or an octagonal plate shape, not the disk shape. Besides, the separator, the first end plate and the second end plate may be formed into a disk plate shape or a polygonal plate shape, such as a rectangular plate shape, a hexagonal plate shape or an octagonal plate shape, not the square plate shape.

The solid electrolyte layer 29 is formed of an oxide ion conductor. Specifically, it is an oxide ion conductor expressed by a general formula (1): Ln1AGaB1B2B3O. Where, in the above general formula (1), Ln1 denotes one or not less than two elements selected from the group consisting of La, Ce, Pr, Nd and Sm and is contained at 43.6 to 51.2 wt. %, A denotes one or not less than two elements selected from the group consisting of Sr, Ca and Ba and is contained at 5.4 to 11.1 wt. %, Ga is contained at 20.0 to 23.9 wt. %, B1 denotes one or not less than two elements selected from the group consisting of Mg, Al and In, B2 denotes one or not less than two elements selected from the group consisting of Co, Fe, Ni and Cu, and B3 denotes one or not less than two elements selected from the group consisting of Al, Mg, Co, Ni, Fe, Cu, Zn, Mn and Zr. When B1 and B3 or B2 and B3 are not the same element, B1 is contained at 1.21 to 1.76 wt. %, B2 is contained at 0.84 to 1.26 wt. %, and B3 is contained at 0.23 to 3.08 wt. %. When B1 and B3 or B2 and B3 are the same element, the total of a B1 content and a B3 content is 1.41 to 2.70 wt. %, and the total of a B2 content and a B3 content is 1.07 to 2.10 wt. %.

Besides, the solid electrolyte layer 29 may be formed of an oxide ion conductor expressed by a general formula (2) $Ln1_{1-x}A_xGa_{1-y-z-w}B1_yB2_zB3_wO_{3-d}$. Where, in the above general formula (2), Ln1 denotes one or not less than two elements selected from the group consisting of La, Ce, Pr, Nd and Sm, A denotes one or not less than two elements selected from the group consisting of Sr, Ca and Ba, B1 denotes one or not less than two elements selected from the group consisting of Mg, Al and In, B2 denotes one or not less than two elements selected from the group consisting of Co, Fe, Ni and Cu, B3 denotes one or not less than two elements selected from the group consisting of Al, Mg, Co, Ni, Fe, Cu, Zn, Mn and Zr, x is 0.05 to 0.3, y is 0.025 to 0.29, z is 0.01 to 0.15, w is 0.01 to 0.15, y+z+w is 0.035 to 0.3, and d is 0.04 to 0.3. By forming the solid electrolyte layer 29 of the oxide ion conductor as set forth above, it becomes possible to perform an electric power generating operation at a relatively low temperature of 650±50° C. without lowering the electric power generation efficiency of the fuel cell 26.

The fuel electrode layer 31 is formed of metal such as Ni, or cermet such as Ni—YSZ, or is formed to be porous by a mixed body of Ni and a compound expressed by a general formula (3): $Ce_{1-m}D_mO_2$. Where, in the general expression (3), D denotes one or not less than two elements selected from the group consisting of Sm, Gd, Y and Ca, m denotes an atomic ratio of D element and is set to be within a range of 0.05 to 0.4, preferably 0.1 to 0.3.

The air electrode layer 32 is formed to be porous by an oxide ion conductor expressed by a general formula (4): $Ln2_{1-x}Ln3_xE_{1-y}Co_yO_{3+d}$. Where, in the above general formula (4), Ln2 denotes one or both elements of La and Sm, Ln3 denotes one or both elements of Ba, Ca and Sr, and E denotes one or both elements of Fe and Cu. Besides, x denotes an atomic ratio of Ln3 and is set to be within a range of larger than 0.5 and less than 1.0. Besides, y denotes an atomic ratio of Co element and is set to be within a range of larger than 0 and not larger than 1.0, preferably not less than 0.5 and not larger than 1.0. Besides, d is set to be within a range of not less than −0.5 and not larger than 0.5.

An example of a manufacturing method of the electric power generating cell 24 will be described below. First, as raw material powder, respective powders of $La_2O_3$, $SrCO_3$, $Ga_2O_3$, MgO, and CoO are weighed and mixed to realize $La_{0.8}Sr_{0.2}Ga_{0.8}Mg_{0.15}CO_{0.05}O_{2.8}$, and then preliminary firing is performed at 1100° C. to form a calcinated body. Next, after this calcinated body is pulverized, a specified binder, solvent and the like are added and mixed to prepare slurry, and a green sheet is prepared from this slurry by a doctor blade method. Next, this green sheet is sufficiently dried in the air and is cut into a predetermined size, and then, it is sintered at 1450° C. so that the solid electrolyte layer 29 is obtained. After an NiO powder and a $(Ce_{0.8}Sm_{0.2})$ $O_2$ powder are mixed so that the volume ratio of Ni and $(Ce_{0.8}Sm_{0.2})O_2$ becomes 6:4, this mixed powder is sintered on one surface of the solid electrolyte layer 29 at 1100° C. to form the fuel electrode layer 31. Further, $(Sm_{0.5}Sr_{0.5})CoO_3$ is sintered on the other surface of the solid electrolyte layer 29 at 1000° C. to form the air electrode layer 32. In this way, the electric power generating cell 24 is fabricated.

Figure 3:
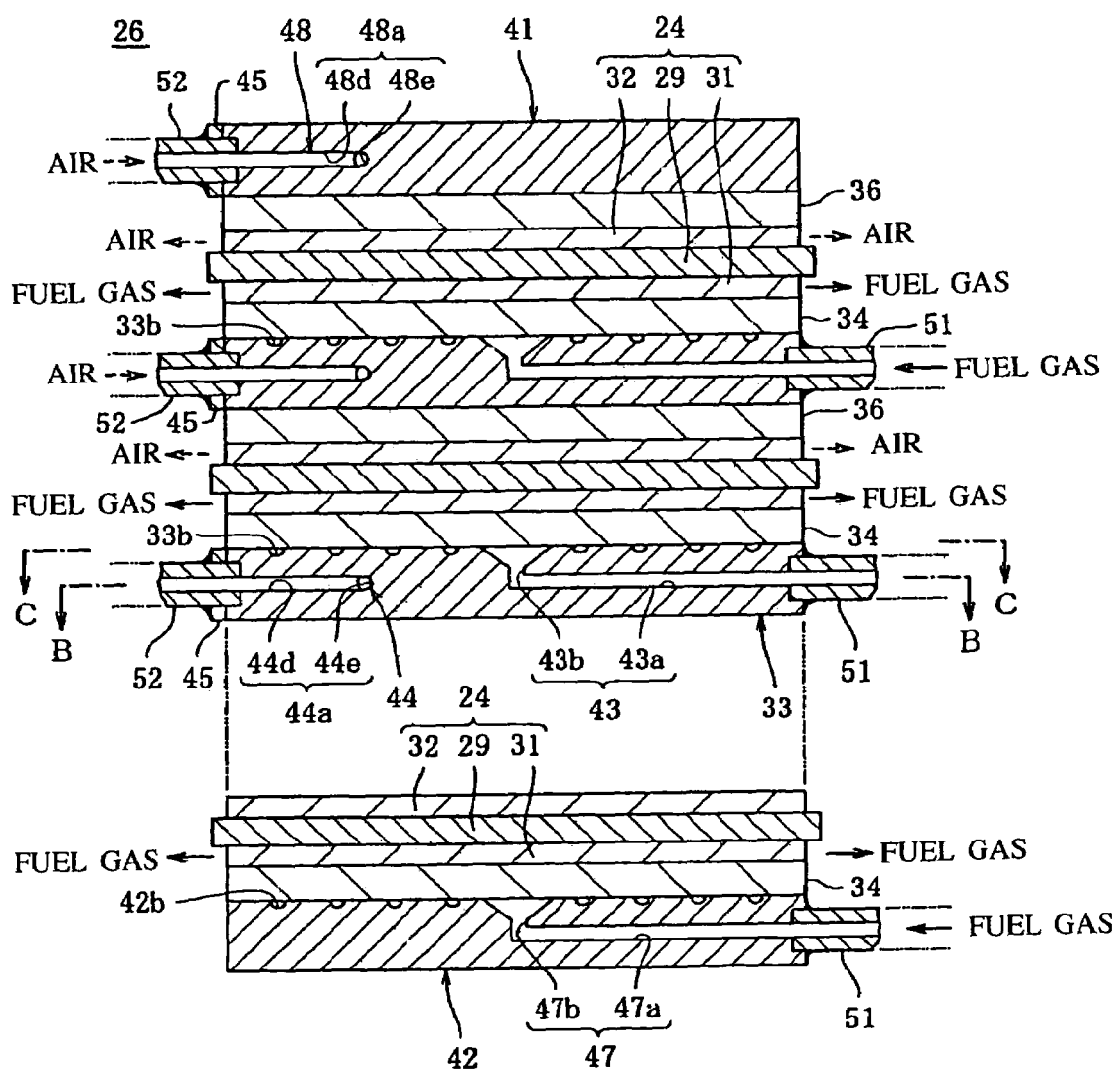
FIG. 3 is a sectional view taken along line A—A of FIG. 4 of a fuel cell used for the fuel cell module.
Figure 4:
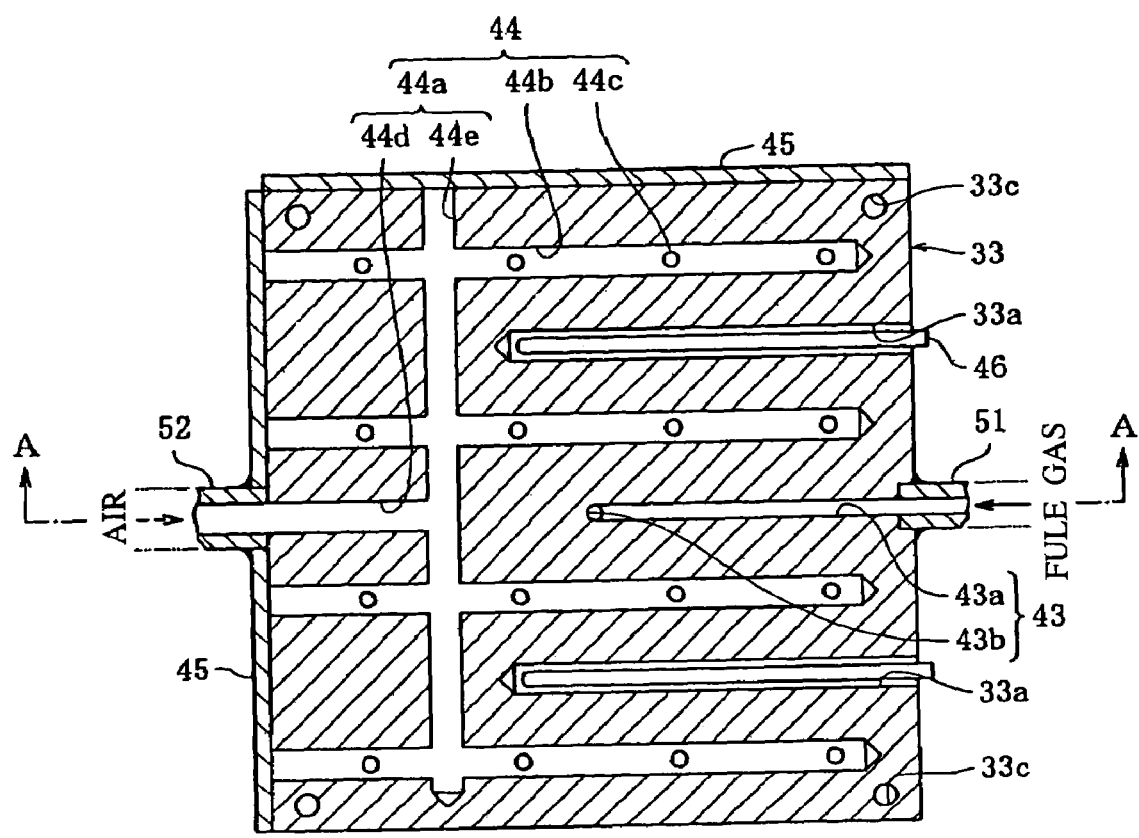
FIG. 4 is a sectional view taken along line B—B of FIG. 3.

It is preferable that the separator 33 is formed of stainless steel, nickel base alloy or chromium base alloy. For example, there are enumerated SUS316, Inconel 600, Hastelloy X (trade name of Haynes Stellite Co.), Haynes alloy 214 and the like. Besides, a fuel supply passage 43, an air supply passage 44 (oxidant supply passage) and plural insertion holes 33a are formed in the separator 33 (FIGS. 3 and 4). The fuel supply passage 43 includes a first fuel hole 43a headed from the outer peripheral surface of the separator 33 to substantially the center, and a second fuel hole 43b communicating with the first fuel hole 43a and facing the fuel electrode current collector 34 from substantially the center of the separator 33. Besides, the air supply passage 44 includes a single first air hole 44a which is formed to extend in the direction orthogonal to the thickness direction of the separator 33, a base end of which is opened to the outer peripheral surface of the separator 33, and a tip end of which is closed, plural second air holes 44b which extend in the direction orthogonal to the thickness direction of the separator 33, which are formed to be spaced from one another at predetermined intervals, which communicate with the single air hole 44a, and both ends of which are closed, and a large number of third air holes 44c formed at predetermined intervals in the surface opposite to the air electrode current collector 36 of the separator 33 and to communicate with the second air holes 44b.

The plural second air holes 44b are formed to be parallel to one another from a side surface adjacent to one side surface of the separator 33 on which the base end of the first air hole 44a is formed. Then, a closing plate 45 is bonded to the adjacent side surface, so that they become long holes both ends of which are closed. The plural insertion holes 33a are formed to be parallel with the first fuel hole 43a and the second air hole 44b so that they do not communicate with any of the fuel supply passage 43 and the air supply passage 44, and first heaters 46 are respectively inserted in these insertion holes 33a (FIG. 4). Besides, three slits 33b are spirally formed from substantially the center of the separator 33 on the surface of the separator 33 opposite to the fuel electrode current collector 34 (FIG. 5), and the depths of these slits 33b are formed to be the same over the whole length. Incidentally, the number of the slits may be two or four or more, not three. Besides, the depths of the slits may be formed so that they gradually become deep or shallow as they go away from the center of the separator.

Referring back to FIG. 3, the fuel electrode current collector 34 is formed of stainless steel, nickel base alloy or chromium base alloy, or nickel, silver, silver alloy or copper to be porous. In the case where it is formed of stainless steel, nickel base alloy or chromium base alloy, it is preferable to perform nickel plating, silver plating, silver plating through nickel under plating, or copper plating. The air electrode current collector 36 is formed of stainless steel, nickel base alloy or chromium base alloy, or silver, silver alloy or platinum to be porous. In the case where it is formed of stainless steel, nickel base alloy, or chromium base alloy, it is preferable to perform silver plating, silver plating through nickel under plating, or platinum plating. Incidentally, in the case where a fuel gas of a low hydrocarbon group, such as $CH_4$, is used as a reformed fuel gas, the fuel electrode current collector is formed of stainless steel, nickel base alloy, or chromium base alloy, which is plated with nickel, or nickel. In the case where CO or $H_2$ is used as the fuel gas, the fuel electrode current collector is formed of stainless steel, nickel base alloy or chromium base alloy, which is plated with silver, plated with silver through nickel under plating, or plated with copper, or silver, silver alloy or copper.

An example of a manufacturing method of the fuel electrode current collector 34 will be described below. First, after atomized powder of stainless steel or the like and HPMC (water soluble resin binder) are kneaded, distilled water and an additive (n-hexane (organic solvent), DBS (surface active agent), glycerol (plasticizer), etc.) are added and kneaded to prepare mixed slurry. Next, after a compact is formed from this mixed slurry by a doctor blade method, foaming, degreasing and sintering are performed under predetermined conditions to obtain a porous plate. Further, this porous plate is cut into parts of predetermined sizes to prepare the fuel electrode current collectors 34. Incidentally, in the case where the atomized powder of stainless steel is used, the surface is subjected to nickel plating, chromium plating or silver plating. In addition, the air electrode current collector 36 is also fabricated in substantially the same manner as the fuel electrode current collector 34.

The first end plate 41 and the second end plate 42 are formed of the same material as the separator 33 to have the same shape (square plate shape). An air supply passage 48 and plural insertion holes (not shown) are formed in the first end plate 41, and a fuel supply passage 47 and plural insertion holes (not shown) are formed in the second end plate 42. The air supply passage 48 is formed similarly to the air supply passage 44, and includes a single first air hole 48a which is formed to extend in the direction orthogonal to the thickness direction of the first end plate 41, the base end of which is opened to the outer peripheral surface of the first end plate 41, and the tip end of which is closed, plural second air holes (not shown) which extend in the direction orthogonal to the thickness direction of the first end plate 41, which are formed to be spaced from one another at predetermined intervals, which communicate with the single first air hole, and both ends of which are closed, and a large number of third air holes (not shown) formed at predetermined intervals in the surface of the first end plate 41 opposite to the air electrode current collector 36 and to communicate with the second air holes. In addition, the fuel supply passage 47 is formed similarly to the fuel supply passage 43, and includes a first fuel hole 47a headed to substantially the center from the outer peripheral surface of the second end plate 42, and a second fuel hole 47b communicating with the first fuel hole 47a and facing the fuel electrode current collector 34 from substantially the center of the second end plate 42.

The plural second air holes formed in the first end plate 41 are formed to be parallel with one another from the side surface adjacent to one side surface of the first end plate 41 on which the base end of the first air hole is formed. Then, the closing plate 45 is bonded to the adjacent side surface so that they become long holes both ends of which are closed. The plural insertion holes of the first end plate 41 are formed to be parallel with the second air holes so as not to communicate with the air supply passage 48, and the heaters (not shown) are respectively inserted into these insertion holes. The plural insertion holes of the second end plate 42 are formed to be parallel with the first fuel hole 47a so as not to communicate with the fuel supply passage 47, and heaters (not shown) are respectively inserted into these insertion holes. Three slits 42b are spirally formed from substantially the center of the second end plate 22 on the upper surface of the second end plate 42 (that is, the opposite surface of the second end plate 42 to the fuel electrode current collector 34 (FIG. 3)). The depths of these slits 42b are formed to be the same over the whole length. Incidentally, the number of the slits may be two or four or more, not three. Besides, the depths of the slits may be formed to gradually become deep or shallow as they go away from the center of the separator.

Figure 5:
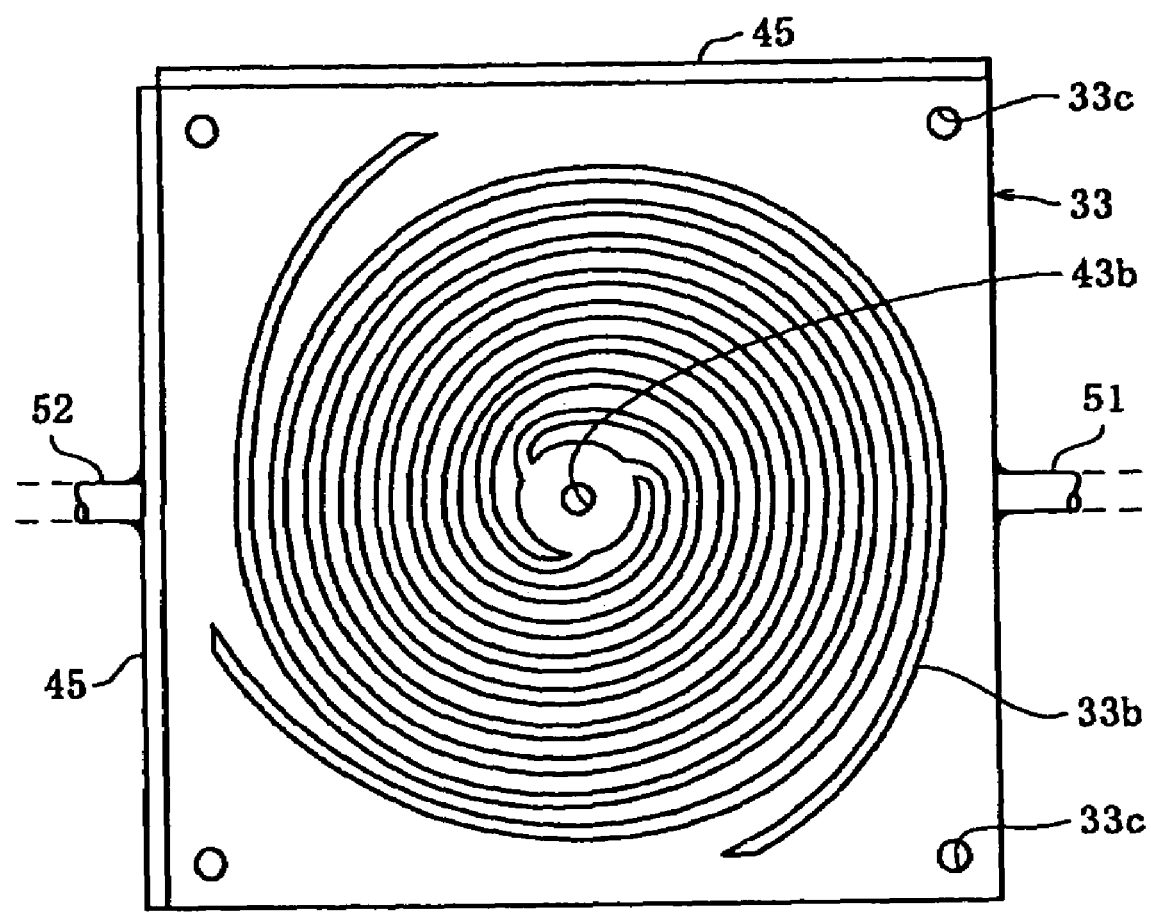
FIG. 5 is a sectional view taken along line C—C of FIG. 3.

Further, through holes 33c through which bolts (not shown) can be inserted are formed at four corners of the separator 33, the first end plate 41 and the second end plate 42 (FIGS. 4 and 5). When the (n+1) electric power generating cells 24, the n separators 33, the (n+1) fuel electrode current collectors 34, the (n+1) air electrode current collectors 36, the single first end plate 41, and the single second end plate 42 are laminated, the bolts are respectively inserted through the through holes 33c formed at the four corners of the separator 33, the first end plate 41, and the second end plate 42, and then nuts are screwed to the tip ends of these bolts, so that the fuel cell 26 is fixed in the laminated state.

Referring back to FIG. 2, the fuel distributor 27 and the air distributor 28 are respectively provided to extend in the laminate direction of the electric power generating cells 24, and are formed to have cylindrical shapes both ends of which are closed. The fuel distributor 27 communicates with and is connected to the first fuel holes 43a of the fuel supply passages 43 of the n separators 33 and the first fuel hole 47a of the fuel supply passage 47 of the single second end plate 42 through (n+1) fuel short pipes 51. The air distributor 28 communicates with and is connected to the first air holes 44a of the air supply passages 44 of the n separators 33 and the first air hole 48a of the air supply passage 48 of the single first end plate 41 through (n+1) air short pipes 52. In this embodiment, the fuel distributor 27, the air distributor 28, the fuel short pipes 51 and the air short pipes 52 are formed of conductive material such as stainless steel.

A fuel insulating pipe (not shown) formed of electrical insulating material such as alumina is put between the fuel short pipe 51 and the fuel distributor 27 in order to secure electrical insulation between the fuel short pipe 51 and the fuel distributor 27, and a gap of these is sealed with a fuel sealing member (not shown) such as glass. Besides, an air insulating pipe (not shown) formed of electrical insulating material such as alumina is put between the air short pipe 52 and the air distributor 28 in order to secure electrical insulation between the air short pipe 52 and the air distributor 28, and a gap of these is sealed with an air sealing member (not shown) such as glass.

A pair of electrode terminals 58, 58 (electrode rods in this embodiment) are electrically connected to the center of the upper surface of the first end plate 41 and the center of the lower surface of the second end plate 42, respectively. The fuel preheating pipe 61 is connected to the upper outer peripheral surface of the fuel distributor 27, and this fuel preheating pipe 61 is spirally wound to be separated from the outer peripheral surface of the fuel cell 26 by a predetermined space and around the axial line of the pair of electrode terminals 58, 58. Besides, the air preheating pipe 62 is connected to the upper outer peripheral surface of the air distributor 28, and this air preheating pipe 62 is spirally wound to be separated from the outer peripheral surface of the fuel cell 26 by a predetermined space and around the axial line of the pair of electrode terminals 58, 58. The spiral radius of the fuel preheating pipe 61 is formed to be smaller than the spiral radius of the air preheating pipe 62.

The fuel cell 26, together with the fuel distributor 27, the air distributor 28, the fuel preheating pipe 61, and the air preheating pipe 62, is contained in the cell case 63. The fuel cell 26, the fuel distributor 27, and the air distributor 28 are separated from the fuel preheating pipe 61 and the air preheating pipe 62 by a cylindrical partition plate 63c into an inside chamber 63d and an outside chamber 63e. The inside chamber 63d and the outside chamber 63e are made to communicate with each other through a communicating pipe 63f. An exhaust gas introduction port 63a for introduction of the exhaust gas of the engine 11 into this case 63 is formed at the upper part of the outer peripheral surface of the cell case 63, and an exhaust gas exhaust port 63b for exhaustion of the exhaust gas introduced in this case 63, together with the fuel gas and air exhausted from the fuel cell 26, to the outside of the case 63 is formed at the lower part of the outer peripheral surface of the cell case 63. The upstream side exhaust pipe 21a is connected to the exhaust gas introduction port 63a, and the downstream side exhaust pipe 21b is connected to the exhaust gas exhaust port 63b. Besides, a reformer 64 is provided at the outer peripheral surface of the cell case 63. This reformer 64 includes a reforming case 66 into which the exhaust gas of the engine 11 is introduced, and a reforming pipe 67 contained in the reforming case 66 and heated by the exhaust gas of the engine 11. An exhaust gas inlet 66a for introduction of the exhaust gas of the engine 11 and an exhaust gas outlet 66b for exhaustion of the exhaust gas of the engine 11 are provided in the reforming case 66. An upstream side branch pipe 21c branching from the upstream side exhaust pipe 21a is connected to the exhaust gas inlet 66a, and a downstream side branch pipe 21d is connected to the exhaust gas outlet 66b. A gasoline supply pipe 68 branching from the refueling pipe 23 is connected to the base end of the fuel preheating pipe 61 through the reforming pipe 67. Further, reforming particles (not shown) are filled in the reforming pipe 67 at such a density that the fuel gas of a low hydrocarbon group, such as gasoline, light oil or $CH_4$, can flow. It is preferable that the reforming particles are formed of elements or oxides containing one or at least two selected from the group consisting of Ni, NiO, $Al_2O_3$, $SiO_2$, MgO, CaO, $Fe_2O_3$, $Fe_3O_4$, $V_2O_3$, $NiAl_2O_4$, $ZrO_2$, SiC, $Cr_2O_3$, $ThO_2$, $Ce_2O_3$, $B_2O_3$, $MnO_2$, ZnO, Cu, BaO and $TiO_2$.

Reference numeral 69 of FIGS. 1 and 2 denotes an air supply pipe connected to the base end of the air preheating pipe 62 in the cell case 63 and for supplying air (or oxygen) to the air preheating pipe 62, and an air flow rate adjusting valve 71 is provided in this pipe 69 (FIG. 1). A module temperature sensor 72 for detecting the temperature of the fuel cell module 13 is inserted in the fuel cell module 13 (FIGS. 1 and 2), and a gasoline injector 73 is provided to the gasoline supply pipe 68 (FIG. 1). A water supply pipe 74 is connected to the gasoline supply pipe 68 at the downstream side of the gasoline injector 73, and a water injector 76 is provided to the water supply pipe 74. The gasoline injector 73 is constructed to spray high melting point hydrocarbon (light oil, etc.), which is liquid at room temperature, to supply it to the reforming pipe 67, and the water injector 76 is constructed to spray water to supply it to the gasoline supply pipe 68.

A first auxiliary heater 81 for heating the reforming pipe 67 is provided in the reformer 64, and a second auxiliary heater 82 for heating the fuel preheating pipe 61 and the air preheating pipe 62 in the outside chamber 63e is provided in the cell case 63. Besides, a reformer temperature sensor (not shown) for detecting the temperature of this reformer 64 is provided in the reformer 64. The first auxiliary heater 81 includes a first case 81a attached to the lower surface of the reforming case 66 and a first burner 81b inserted in this first case 81a. The second auxiliary heater 82 includes a second case 82a attached to the lower surface of the cell case 63 and a second burner 82b inserted in this second case 82a. A structure is adopted such that light oil is supplied to the first and the second burners 81b and 82b. Further, first to third motor valves 91 to 93 are provided in the upstream side exhaust pipe 21a, the upstream side branch pipe 21c and the communicating pipe 63f. The first to the third motor valves 91 to 93 include valve bodies 91a to 93a for opening and closing the pipes 21a, 21c and 63f, and first to third motors 91b to 93b for driving these valve bodies 91a to 93a.

The detection outputs of the module temperature sensor 72 and the reformer temperature sensor are respectively connected to the control input of a controller 77, and the control outputs of the controller 77 are respectively connected to the air flow rate adjusting valve 71, the gasoline injector 73, the water injector 76, an electric power supply-demand selector 78, the heater 46, the first auxiliary heater 81, the second auxiliary heater 82, the first to the third motors 91b to 93b, and the carburetor 22. The generator 12, the fuel cell module 13, the secondary battery 14 and the electric motor 16 are electrically connected to the electric power supply-demand selector 78. An engine automatic on/off device (not shown) for automatically starting or stopping the engine 11 is provided in the engine 11, and this device is connected to the control output of the controller 77. Further, the secondary battery 14 is constructed to store electric power supplied from one of or both of the generator 12 and the fuel cell module 13 by the electric power supply-demand selector 78, and electric power is supplied to the electric motor 16 by the electric power supply-demand selector 78 from one or at least two selected from the group consisting of the generator 12, the fuel cell module 13 and the secondary battery 14. Incidentally, reference numeral 79 of FIG. 2 denotes an insulating ring for electrically insulating the cell case 63 from the pair of electrode terminals 58, 58.

The operation of the hybrid power system constructed as stated above will be described.

When the engine 11 is started, the engine 11 generates mechanical power, and this mechanical power is transmitted from the crank shaft 11a to the input shaft 12a of the generator 12, so that the generator 12 is driven to generate electric power. Since the temperature of the fuel cell module 13 immediately after the starting of the engine 11 does not reach the temperature (for example, 650° C.) at which electric power can be generated, the controller 77 keeps the gasoline injector 73, the water injector 76, and the first motor valve 91 in the closed state on the basis of the respective detection outputs of the module temperature sensor 72 and the reformer temperature sensor (not shown), and keeps the air flow rate adjusting valve 71, the second motor valve 92 and the third motor valve 93 in the open state. The controller 77 further controls the electric power supply-demand selector 78 to supply the electric power generated by the generator 12 and the electric power stored in the secondary battery 14 to the electric motor 16 and to cause the automobile to run. Here, the air is made to flow to the fuel cell module 13 immediately after the starting of the engine 11 since the air heated by the air (oxidant) preheating pipe 62 is uniformly blown to the whole surface of the electric power generating cell 24 from the separator 33 and the second end plate 42, so that heating can also be performed from the inside of the fuel cell 26. While the temperature of the fuel cell 26 is kept uniform, it can be quickly heated. Further, in the case where the quick electric power generating operation of the fuel cell module 13 is required, power is applied to the heater 46.

On the other hand, when the engine 11 is started, a high temperature exhaust gas is exhausted from the engine 11. Nearly half of the exhaust gas is supplied to the outside chamber 63e in the cell case 63 through the exhaust manifold 19 and the upstream side exhaust pipe 21a, and the remaining half is supplied into the reforming case 66 through the upstream side branch pipe 21c branching from the upstream side exhaust pipe 21a. When the module sensor 72 detects that the fuel cell 26 in the cell case 63 is heated by the exhaust gas of the engine 11 or the exhaust gas of the engine 11 and the heater 46 to reach the temperature at which electric power can be generated, the controller 77 opens the gasoline injector 73, the water injector 76, and the first motor valve 91 at predetermined opening degrees, respectively, on the basis of the detection output of the module temperature sensor 72. If power is being applied to the heater 46, the application of the power to the heater 46 is stopped. When the gasoline injector 73 and the water injector 76 are opened, gasoline and water flow into the reforming pipe 67 of the reformer 64 are heated by the exhaust gas passing through the reforming case 66 to be vaporized, and become a fuel gas containing water vapor.

The fuel gas containing the water vapor comes in contact with the reforming particles in the reforming pipe 67 to be reformed into the low hydrocarbon group, and flows into the fuel preheating pipe 61 in the cell case 63. This reformed fuel gas spirally goes round the outer peripheral surface of the fuel cell 26 in the fuel preheating pipe 61 and exchanges heat with the high temperature exhaust gas so that it is further heated. Then, it is supplied to the fuel distributor 27, and the air flowing into the air preheating pipe 62 from the air supply pipe 69 spirally goes round the outer peripheral surface of the fuel cell 26 in the air preheating pipe 62 and exchanges heat with the high temperature exhaust gas, so that it is heated. Then, it is supplied to the air distributor 28. Incidentally, when it takes a long time before the fuel cell 26 in the cell case 63 reaches the temperature at which electric power can be generated by heating of only the exhaust gas of the engine 11 and the heater 46, the controller 77 operates the first and the second auxiliary heaters 81 and 82.

When the fuel gas heated up to the temperature most suitable for the electric power generation and reformed is introduced into the fuel distributor 27, this fuel gas passes through the fuel short pipe 51 and the fuel supply passages 43 and 47, and is discharged from substantially the center of the separator 33 and the second end plate 42 toward the center of the fuel electrode current collector 34. By this, the fuel gas passes through pores in the fuel electrode current collector 34 and is quickly supplied to substantially the center of the fuel electrode layer 31, and is further guided by the slit 33b of the separator 33 and the slit 42b of the second end plate 42 to spirally flow from substantially the center of the fuel electrode layer 31 to the outer peripheral edge. At the same time, when the air heated up to the temperature most suitable for electric power generation is introduced into the air distributor 28, this air passes through the air short pipe 52 and the air supply passages 44 and 48, and is discharged like a shower from the large number of third air holes 44c of the separator 33 and the large number of third air holes (not shown) of the first end plate 41 toward the air electrode current collector 36. By this, the air passes through pores in the air electrode current collector 36 and is substantially uniformly supplied to the air electrode layer 32.

The air supplied to the air electrode layer 32 passes through pores in the air electrode layer 32 and reaches the vicinity of an interface relative to the solid electrolyte layer 29, and oxygen in the air receives electrons from the air electrode layer 32 in this portion and is ionized into oxide ions ($O^{2-}$). This oxide ion diffuses and moves in the solid electrolyte layer 29 toward the direction of the fuel electrode layer 31, and when reaching the vicinity of an interface relative to the fuel electrode layer 31, it reacts with the fuel gas in this portion to produce a reaction product (for example, $H_2O$), and releases electrons to the fuel electrode layer 31. A current is generated by extracting the electrons to the fuel electrode current collector 34, and the electric power can be obtained.

As set forth above, the fuel gas is discharged from substantially the center of the separator 33 and substantially the center of the second end plate 42 and is guided by the slits 33b and 42b, so that the reaction passage of the fuel gas becomes long. As a result, the fuel gas collides with the fuel electrode layer 31 many times until the fuel gas reaches the separator 33 and the outer peripheral edge of the second end plate 42, so that the number of reactions is increased and the performance of the fuel cell 26 can be improved. Accordingly, as the outer diameters of the separator 33 and the second end plate 42 become large, the reaction passage of the fuel gas becomes long, and the number of reactions is increased by this, which results in the increase of output of the fuel cell 26. Incidentally, (n+1) electric power generating cells 24 are connected in series through the separators 33 formed by a conductive material, the fuel electrode current collectors 34, and the air electrode current collectors 36, and the pair of electrode terminals 58 and 58 are provided at the first end plate 41 and the second end plate 42 on both ends of the fuel cell 26, so that large electric power can be extracted from these electrode terminals 58 and 58.

High temperature fuel gas is exhausted from the outer peripheral surface of the fuel electrode layer 31, and high temperature air is exhausted from the outer peripheral surface of the air electrode layer 32, so that these mixed gases pass through the communicating pipe 63f and flow into the outside chamber 63e, and the fuel gas in the fuel preheating pipe 61 and the air in the air preheating pipe 62 are heated. As a result, the controller 77 closes the second motor valve 91 to stop the introduction of the exhaust gas of the engine 11 into the cell case 63 after a predetermined time has passed since the fuel cell 26 started the electric power generation. On the other hand, when the fuel cell module 13 generates electric power, the controller 77 controls the electric power supply-demand selector 78 to supply the electric power from the fuel cell module 13 to the electric motor 16, and controls the carburetor to stop the supply of gasoline to the intake pipe 18 and stops the engine 11. When the output of the electric motor 16 is insufficient, or when the charging quantity of the secondary battery 14 is insufficient, the controller 77 starts the engine 11, and electric power is supplied from the generator 12 to the electric motor 16 or the secondary battery 14.

Incidentally, in the above embodiment, although the solid electrolyte layer is formed of the oxide ion conductor expressed by the general formula (1): Ln1AGaB1B2B3O or the general formula (2): $Ln1_{1-x}A_xGa_{1-y-z-w}B1_yB2_zB3_wO_{3-d}$, it may be formed of an oxide ion conductor made of YSZ (stabilized zirconia added with yttria), or may be formed of a proton conductor (ceria etc.).

In the above embodiment, although the electric motor is cited as the electric equipment, the electric equipment may be a computer, a lamp (illuminating lamp), an electric heater or the like.

In the above embodiment, the mechanical power generated by the engine is converted into the electric power by the generator, the electric motor is driven by one of or both of this electric power and the electric power generated by the fuel cell module, and the automobile is caused to run by the mechanical power generated by the electric motor. However, a ship, a train, an airplane (propeller type), a motor cycle, a construction equipment or the like may be driven. In addition, a first clutch is connected to a crank shaft of the engine, and a second clutch is connected to an output shaft of the electric motor driven by the electric power generated by the fuel cell module, and an automobile, a ship, a train, an airplane (propeller type), a motor cycle, a construction equipment or the like may be driven by one of or both of the mechanical powers generated by the electric motor and the engine.

According to the above embodiment, although gasoline is supplied to the engine and the reformer, light oil or propane may be supplied.

In the above embodiment, the reforming particles are filled in the reforming pipe of the reformer at such a density that gasoline or the like can flow, and the gasoline or the like is reformed into the fuel gas of the low hydrocarbon group by the reforming particles. However, the reforming particles are filled in the fuel preheating pipe at such a density that gasoline or the like can flow, and if the gasoline or the like can be reformed by the reforming particles into the fuel gas of the low hydrocarbon group, the reformer becomes unnecessary.

Further, in the above embodiment, although the separator is formed of stainless steel, nickel base steel or chromium base alloy, it may be formed of ceramic having conductivity, such as lanthanum chromite ($La_{0.9}Sr_{0.1}CrO_3$).

INDUSTRIAL APPLICABILITY

As described above, according to the invention, power is generated by combustion of the mixture of the fuel gas obtained by vaporizing hydrocarbon and the air, the fuel gas obtained by reforming the hydrocarbon is supplied to the fuel electrode layer of the fuel cell module in which the plural electric power generating cells each including the solid electrolyte layer, and the fuel electrode layer and the air electrode layer disposed on both sides thereof are laminated, and air or oxygen is supplied to the air electrode layer so that electric power is generated at 930° C. or lower. One of or both of the mechanical power generated by the engine and the electric power generated by the fuel cell module are outputted. Accordingly, when the engine is started, the engine generates the mechanical power, and when the fuel cell module reaches the predetermined temperature, the fuel gas obtained by reforming the hydrocarbon, together with the air or oxygen, is supplied to the fuel cell module, and the fuel cell module starts the electric power generation and generates the electric power. When the electric power generated by the fuel cell module is sufficient, the engine is stopped, and when the output generated by the fuel cell module is insufficient, the engine is started and the mechanical power generated by this engine is outputted.

Besides, as compared with the conventional fuel cell system using methanol as the raw material of the fuel gas supplied to the fuel cell module, which can not be supplied in a normal gasoline station, the invention can use gasoline which can be supplied in a normal gasoline station.

If the fuel cell module is made to be heated by the exhaust gas exhausted from the engine and can be started, since the fuel cell module is heated by the heat of the exhaust gas up to the temperature at which the fuel cell module can be started, the fuel cell module comes to be capable of generating electric power.

If the mechanical power generated by the engine is made to be converted into electric power by the generator and is outputted, when the engine is started, the generator is driven by the engine to generate the electric power. As a result, when the electric power generated by the fuel cell module is sufficient, the engine is stopped, and when the electric power generated by the fuel cell module is insufficient, the engine is started, and the mechanical power generated by the engine is converted into electric power by the generator and is outputted.

If the electric power generated by one of or both of the fuel cell module and the generator is made to be stored in the secondary battery, when the output is insufficient, the electric power stored in the secondary battery is outputted, and when the electric power generated by the fuel cell module or the generator is superfluous, the electric power generated by the fuel cell module or the generator is stored in the secondary battery.

If the electric power generated by one or at least two selected from the group consisting of the fuel cell module, the generator, and the secondary battery is made to be outputted to the electric equipment, and this electric equipment is driven by the electric power, when the electric power outputted from the fuel cell module to the electric equipment is sufficient, the engine is stopped, and when the electric power outputted to the electric equipment is insufficient, the engine is started, and the mechanical power outputted by the engine is converted into the electric power by the generator and is outputted to the electric equipment.

If the fuel gas supplied to the electric power generating cell is reformed by the exhaust gas exhausted from the engine, the fuel gas becomes the low hydrocarbon group most suitable for the electric power generating operation.

The fuel preheating pipe and the oxidant (air) preheating pipe are provided in the fuel cell module, the oxidant (air) preheating pipe is preheated by the exhaust gas exhausted from the engine, and the oxidant gas passing through the oxidant preheating pipe is heated. Further, the fuel preheating pipe is preheated by the exhaust gas exhausted from the engine, and the hydrocarbon containing water vapor passing through the fuel preheating pipe is reformed. Accordingly, when the fuel gas and the oxidant gas are supplied to the electric power generating cell, the whole fuel cell module is quickly heated up to the most suitable temperature and electric power generation is enabled.

If the reforming particles are filled in the fuel preheating pipe at such a density that hydrocarbon can flow, the fuel gas containing water vapor comes in contact with the reforming particles in the fuel preheating pipe, and is reformed into the fuel gas of the low hydrocarbon group, or the like and is supplied to the electric power generating cell.

If the exhaust gas of the engine is introduced into the reforming case of the reformer and the reforming particles are filled in the reforming pipe contained in this reforming case, when hydrocarbon, together with water, flows into the reforming pipe, this hydrocarbon and water are heated by the exhausted gas of the engine and are vaporized, and become the fuel gas containing water vapor. As a result, the fuel gas containing the water vapor is efficiently reformed into the fuel gas of the low hydrocarbon group, or the like by the reformer.

Since the reformer is provided near the fuel cell module, the reformer absorbs heat generated from the fuel cell module at the time of electric power generation, and the fuel gas containing the water vapor is further efficiently reformed into the fuel gas of the low hydrocarbon group, or the like, by the reforming particles in the reforming pipe.

If the reforming pipe in the reformer is heated by the first auxiliary heater, since the hydrocarbon and water in the reforming pipe of the reformer is heated by not only the exhaust gas of the engine but also the first auxiliary heater, they are quickly vaporized into the fuel gas containing the water vapor. Further, the fuel gas containing the water vapor comes in contact with the reforming particles in the reforming pipe, and is quickly reformed into the fuel gas of the low hydrocarbon group, or the like.

If the fuel preheating pipe and the oxidant preheating pipe in the fuel cell module are heated by the second auxiliary heater, since the fuel gas and the oxidant gas are heated by not only the exhaust gas of the engine but also the second auxiliary heater, they are heated up to a relatively high temperature most suitable for electric power generation. Then, they are supplied to the electric power generating cell.

If the hydrocarbon having a high melting point, which is liquid at room temperature, among hydrocarbons is sprayed by the fuel injector and is supplied to the fuel preheating pipe, or water is sprayed by the water injector and is supplied to the fuel supply pipe, the liquid fuel or water can be quickly vaporized.

Further, if the module temperature sensor for detecting the temperature of the fuel cell module is inserted in the fuel cell module, and the controller controls the fuel cell module to start the electric power generating operation when the module temperature sensor detects that the fuel cell module is heated by the exhaust gas of the engine and reaches the temperature at which electric power can be generated, the fuel cell module can efficiently generate electric power.

What is claimed is:

1. A hybrid power system comprising:
   a combustion engine for generating mechanical power by combustion of a fuel gas mixture obtained by vaporizing hydrocarbon and air;
   a fuel cell module including:
      a cell case having a first chamber and a second chamber divided by a partition plate; and
      a fuel cell unit including a plurality of electric power generating cells for producing electricity at 930° C. or lower to generate electric power, said fuel cell unit being located in said first chamber, each of said electric power generating cells including:
         a fuel electrode layer;
         an air electrode layer; and
         a solid electrolyte layer between said fuel electrode layer and said air electrode layer such that said fuel electrode layer, said air electrode layer and said solid electrolyte layer are laminated, said combustion engine and said fuel cell module being arranged such that at least one of the mechanical power generated by said combustion engine and the electric power generated by said fuel cell module is outputted;
   an exhaust gas supply pipe extending between said combustion engine and said cell case for introducing exhaust gas from said combustion engine into said second chamber of said cell case of said fuel cell module;
   a fuel preheating pipe extending through said second chamber of said cell case of said fuel cell module, said fuel preheating pipe being arranged to be heated by the exhaust gas exhausted from said combustion engine and introduced into said second chamber via said exhaust gas supply pipe so as to preheat fuel gas passing through said fuel preheating pipe so that hydrocarbon containing water vapor and passing through said fuel preheating pipe is reformed;
   an oxidant preheating pipe extending through said second chamber of said cell case of said fuel cell module, said oxidant preheating pipe being arranged to be heated by the exhaust gas exhausted from said combustion engine and introduced into said second chamber via said exhaust gas supply pipe so as to preheat oxidant gas passing through said oxidant preheating pipe;
   wherein said fuel preheating pipe is arranged to supply the preheated fuel gas obtained by reforming the hydrocarbon to said fuel electrode layer of each of said electric power generating cells, and said oxidant preheating pipe is arranged to supply the preheated oxidant gas to said air electrode layer of each of said electric power generating cells, so as to thereby heat said electric power generating cells to a predetermined temperature.

2. The hybrid power system of claim 1, wherein said combustion engine and said fuel cell module are arranged so that said fuel cell module is heated by the exhaust gas exhausted from said combustion engine.

3. The hybrid power system of claim 1, further comprising a generator for converting the mechanical power generated by said combustion engine into electric power, and for outputting the electric power.

4. The hybrid power system of claim 3, further comprising a secondary battery for storing the electric power generated by at least one of a group consisting of said fuel cell module and said generator.

5. The hybrid power system of claim 4, wherein the electric power from at least one of a group consisting of said fuel cell module, said generator, and said secondary battery is outputted to electric equipment, and said electric equipment is driven by the outputted electric power.

6. The hybrid power system of claim 5, wherein said electric equipment is an electric motor.

7. The hybrid power system of claim 1, wherein said fuel preheating pipe includes reforming particles filled therein at a density such that the hydrocarbon can flow therethrough.

8. The hybrid power system of claim 1, further comprising a first auxiliary heater for heating said fuel preheating pipe.

9. The hybrid power system of claim 8, further comprising a second auxiliary heater in said fuel cell module, said second auxiliary heater being operable to heat said fuel preheating pipe and said oxidant preheating pipe.

10. The hybrid power system of claim 1, further comprising:
    a fuel supply pipe connected to a base end of said fuel preheating pipe; and
    a fuel injector for spraying a hydrocarbon into said fuel supply pipe so as to supply the hydrocarbon into said fuel preheating pipe.

11. The hybrid power system of claim 10, further comprising:
    a water supply pipe connected to said fuel supply pipe; and
    a water injector for spraying water into said water supply pipe so as to supply the water into said fuel supply pipe.

12. The hybrid power system of claim 1, further comprising:
    a reformer at said cell case of said fuel cell module, said reformer including a reforming case into which the exhaust gas of said combustion engine is introduced; and
    a reforming pipe housed in said reforming case and filled with reforming particles at a density such that the hydrocarbon can flow through said reforming pipe, said reforming pipe being connected to a base end of said fuel preheating pipe;

wherein said reforming pipe is operable to reform the hydrocarbon into one of a fuel gas of a low hydrocarbon group or a fuel gas of CO or $H_2$, and is arranged to supply the fuel gas to said electric power generating cells of said fuel cell module via said fuel preheating pipe.

13. The hybrid power system of claim 12, further comprising a first auxiliary heater for heating said fuel preheating pipe.

14. The hybrid power system of claim 1, further comprising:
a module temperature sensor inserted into said fuel cell module for detecting a temperature of said fuel cell module; and
a controller for controlling said fuel cell module to start generating the electric power when said module temperature sensor detects that the temperature of said fuel cell module has reached an electric power generation temperature for generating the electric power.

15. The hybrid power system of claim 14, further comprising a secondary battery for storing the electric power generated by at least one of a group consisting of said fuel cell module and a generator connected to said combustion engine, said controller being operable to control at least one of a group consisting of said combustion engine, said fuel cell module, and said secondary battery based on a load of electric equipment to be driven by the electric power.

16. The hybrid power system of claim 14, further comprising:
a first auxiliary heater for heating said fuel preheating pipe;
a second auxiliary heater in said fuel cell module, said second auxiliary heater being operable to heat said fuel preheating pipe and said oxidant preheating pipe;
a fuel supply pipe connected to a base end of said fuel preheating pipe;
a fuel injector for spraying a hydrocarbon into said fuel supply pipe so as to supply the hydrocarbon into said fuel preheating pipe;
a water supply pipe connected to said fuel supply pipe;
a water injector for spraying water into said water supply pipe so as to supply the water into said fuel supply pipe;
a reformer at said cell case of said fuel cell module, said reformer including a reforming case into which the exhaust gas of said combustion engine is introduced;
an oxidant flow rate adjusting valve in an oxidant supply pipe connected to a base end of said oxidant preheating pipe; and
a reformer temperature sensor for detecting a temperature of said reformer;
wherein said controller is further operable to control said fuel injector, said water injector, said oxidant flow rate adjusting valve, said first auxiliary heater, and said second auxiliary heater based on respective detected temperature outputs of said module temperature sensor and said reformer temperature sensor.

17. The hybrid power system of claim 14, further comprising:
a communicating pipe for connecting said first chamber of said cell case of said fuel cell module and said second chamber;
a first motor valve in said communicating pipe for opening and closing said communicating pipe;
an upstream side exhaust pipe for connecting said combustion engine and said fuel cell module;
a second motor valve in said upstream side exhaust pipe for opening and closing said upstream side exhaust pipe;
an upstream side branch pipe for connecting said upstream side exhaust pipe and a reformer; and
a third motor valve in said upstream side branch for opening and closing said upstream side branch pipe;
wherein said controller is further operable to control said first motor valve, said second motor valve, and said third motor valve based on respective detected temperature outputs of said module temperature sensor and a reformer temperature sensor inserted in said reformer.

18. The hybrid power system of claim 1, wherein the electric power from at least one of a group consisting of said fuel cell module, a generator connected to said combustion engine, and a secondary battery is outputted to electric equipment, and said electric equipment is driven by the outputted electric power, and wherein an automobile, a ship, a train, an airplane, a motorcycle or construction equipment is driven by mechanical power generated by at least one of a group consisting of said electric equipment and said engine.

* * * * *